Figure 1:
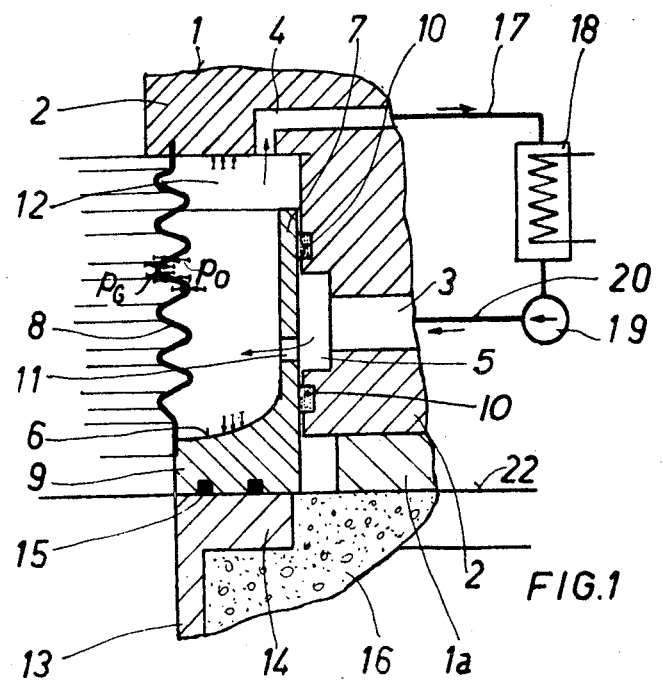

United States Patent [19]

Schwarz

[11] 3,847,734
[45] Nov. 12, 1974

[54] TUBULAR CONNECTOR ASSEMBLY OF A NUCLEAR REACTOR CHARGE MACHINE

[75] Inventor: Hans Schwarz, Nussbaumen, Switzerland

[73] Assignee: Aktiengesellschaft Brown, Boveri & Cie, Baden, Switzerland

[22] Filed: Mar. 21, 1972

[21] Appl. No.: 236,611

[30] Foreign Application Priority Data
Mar. 25, 1971   Switzerland.......................... 4408/71

[52] U.S. Cl. ................................. 176/31, 214/18 N
[51] Int. Cl............................................. G21c 19/22
[58] Field of Search .......... 176/30, 31, 32; 214/18 N

[56] References Cited
UNITED STATES PATENTS

| 3,515,639 | 6/1970 | Pflugrad | 176/30 X |
| 3,629,062 | 12/1971 | Muenchow | 214/18 N |

FOREIGN PATENTS OR APPLICATIONS

| 225,999 | 3/1958 | Australia | 176/30 |

*Primary Examiner*—Carl D. Quarforth
*Assistant Examiner*—P. K. Pavey
*Attorney, Agent, or Firm*—Pierce, Scheffler & Parker

[57] ABSTRACT

An axially movable tubular connector assembly component of a charging machine for a reactor adapted to be located on and movable over a platform of the reactor into alignment with, and for connection to, the ends of individual stand pipes for the purpose of exchanging fuel or moderator components which are introduced into the core of the reactor through the stand pipes. The connector assembly includes a cylinder, an annular piston slidable into and out of one end of the cylinder and a cylindric open-ended bellows unit located within and secured at one end to the piston crown. Pressurized fluid admitted into an annular chamber formed within the cylinder between the bellows unit and the surrounding piston and cylinder wall serves to extend the bellows unit and advance the piston so as to seat the annular crown onto the end of the stand pipe thereby to establish a charging passageway for the stand pipe leading through the open-ended bellows unit and the other end of the cylinder into the interior of the charging machine. The piston can be unseated by depressurizing the annular chamber and applying a driving force to the piston in the opposite direction.

7 Claims, 3 Drawing Figures

TUBULAR CONNECTOR ASSEMBLY OF A NUCLEAR REACTOR CHARGE MACHINE

The present invention relates to an improved construction for an axially movable tubular connector assembly component of a so-called charging machine for a nuclear reactor, the charging machine being located, for example, on a platform of the reactor and the connector assembly being movable laterally into alignment with the ends of individual stand pipes terminating at the platform level for the purpose of exchanging fuel or moderator components which are introduced into the core of the reactor through the stand pipes.

The connector assembly component of a charging machine for nuclear reactors, and particularly in the case of a reactor of the gas-cooled type, must satisfy the requirement that the exchange of core components be carried out with complete safety for the operating personnel and also the reactor building itself. It is particularly important that liberation of heated gases or of radio-active radiation within the reactor building or the neighboring regions be prevented. These requirements must be particularly strictly observed if the exchanging procedure for the fuel or moderator components is required to be carried out while the reactor is operating under load conditions.

It has previously been proposed to insert a movable pipe on the connector assembly of the charging machine into the stand pipe thereby to provide a connection between them while the exchange of fuel or moderator elements is taking place. However, because of the sliding friction which is involved between the connector pipe and stand pipe as well as the high temperature differences which exist between them, there is great risk of wearing or eroding away the surfaces or even pressure welding them together. This undesirable tendency is accelerated when helium is used as a cooling gas so that after continued use, the charging machine may at times become non-functional or may even fail completely thus resulting in a complete shut-down of the reactor.

In accordance with the present invention, these dangers are eliminated. Instead of using an insertion pipe liable to seizing within the standpipes of the reactor, the present invention provides a connector assembly which includes an annular piston structure having a crown of substantially the same diameter as the stand pipe and to which one end of an open-ended cylindrical bellows unit is secured. The piston also includes a skirt portion slidable in and out of one end of a stationary pressure cylinder, the other end of the pressure cylinder being connected to the other open end of the bellows unit. An annular chamber formed between the bellows unit and the surrounding piston skirt and cylinder is connected to a source of pressurized fluid such as a pump and the pressure produced within the chamber and cylinder serves to simultaneously expand the bellows unit from a relaxed position and force the piston crown, or an equalizing ring connected to it if one is used, into a pressed and sealing fit with the then open end wall structure of the stand pipe thus establishing a sealed-off connection between the stand pipe and the connector assembly and providing a charging passageway through the latter extending axially through the annular piston crown and open-ended bellows unit into the main body of the charging machine. Retraction of the annular piston crown, which thus forms the mouthpiece of the connector assembly, from its sealing contact with the end wall of the stand pipe, when it is desired to shift the charging machine to another stand pipe, can be effected by utilizing the inherent tendency of the bellows unit to restore itself to its relaxed position when the pressure is relieved, or preferably the piston crown can be forced away from the end of the stand pipe by applying a hydraulic force in that direction to the piston from another chamber established within the cylinder.

A secondary feature of the inventive concept resides in the fact that stress on the open-ended bellows unit in the radial direction is avoided by equalizing the hydraulic pressure existing at the outer side of the bellows unit and the reactor gas pressure existing at the inner side of the bellows unit.

A further secondary feature is that all parts which slide upon each other, for example, the skirted piston and pressure cylinder, are excluded from any deleterious effect of the reactor coolant, e.g., helium, and moreover are lubricated by the pressure medium utilized which is preferably oil.

Still another secondary feature of the invention is that the pressure medium introduced into the annular chamber between the bellows unit and the pressure cylinder and which picks up heat from the bellows unit is cooled by means of a heat exchanger located in the system utilized for circulating the pressure medium. Cooling of the connector assembly, or of its principal parts, has an additioal advantage since possible differential expansion effects are reduced, and the seal-tightness of the assembly relative to the surrounding region may thus be improved.

It is also advantageous if, in the case where the bellows unit is being stressed at the inside by the pressurized gas of the nuclear reactor and at the outside by the pressurized medium used for actuating the piston, the respective pressures of the reactor gas and pressure medium are equalized by means of a system which incorporates an equalizing vessel.

As previously indicated, it is also advantageous if the piston crown is provided with a compensating ring jointed to it by a resilient means such as to enable it to compensate for any mis-alignment as may occur between the respective axes of the connector assembly and stand pipe thus to assure a gas-tight seal between them under all conditions.

The improvement in safety can also be regarded as a furhter advantage offered by the connector assembly in accordance with the invention since, even in the case where a fracture of the bellows unit occurs, the connection cannot be broken, or leakage occur, so long as the pressure of the reactor gas is higher than that of the surrounding atmosphere since the reactor gas pressure will then act directly upon the skirted piston and hold it in its advanced postion in sealing contact with the end wall of the stand pipe.

Figure 2:
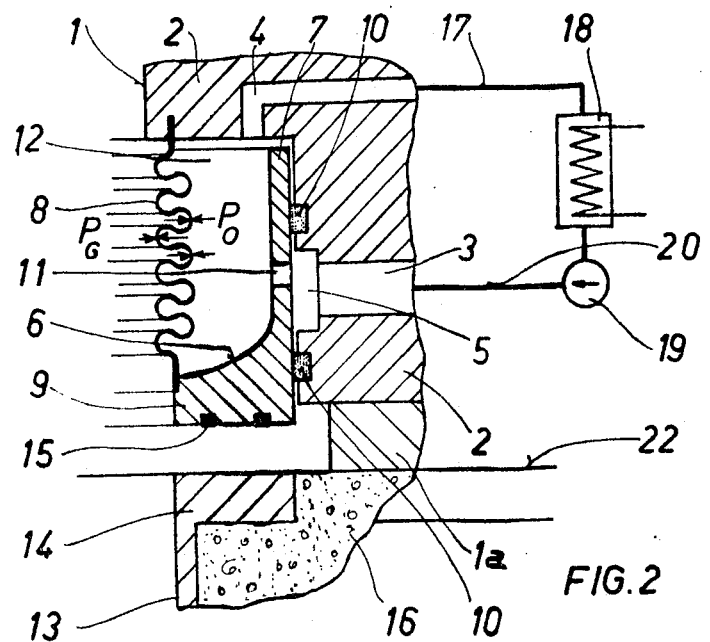
Figure 3:
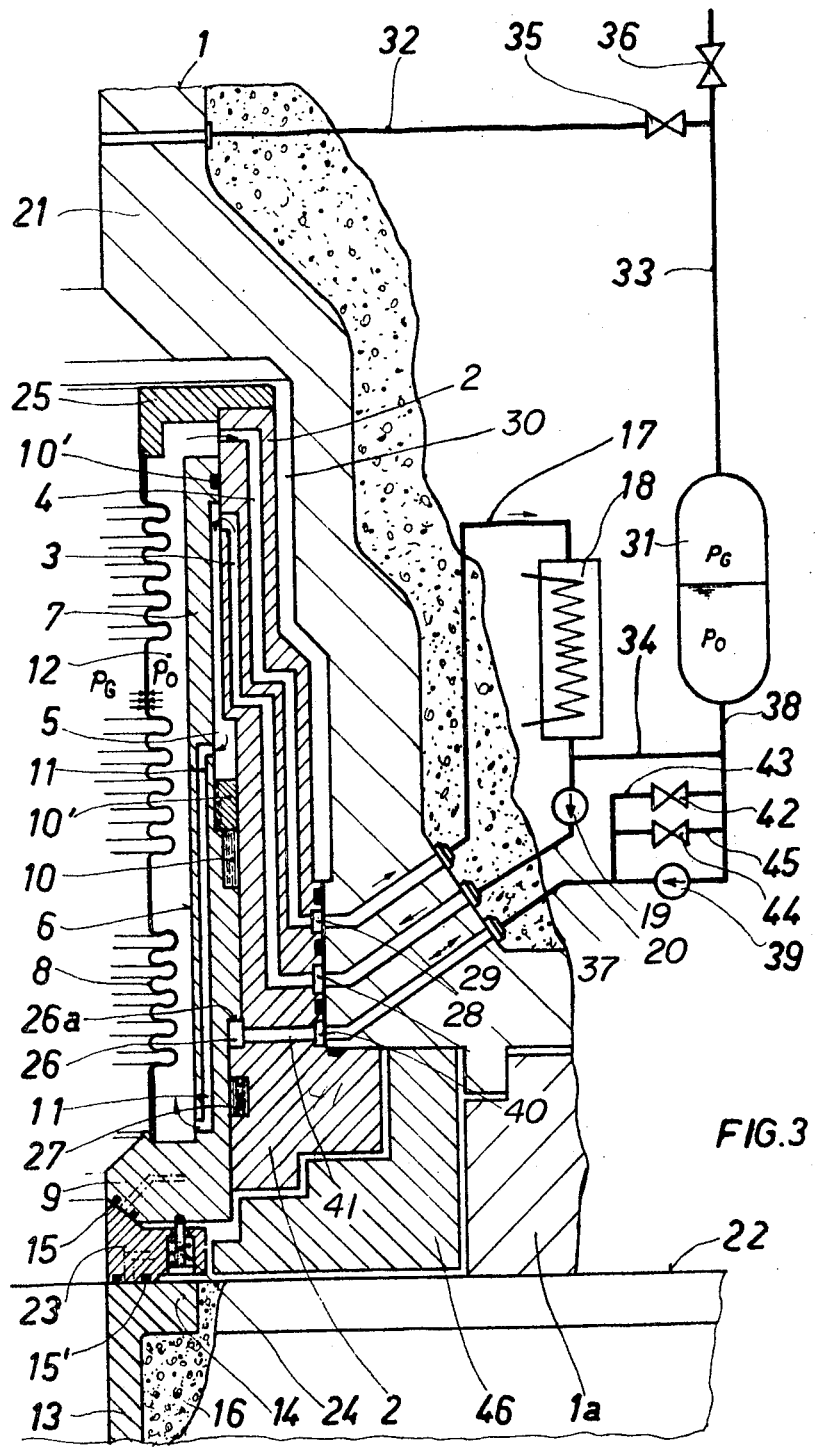

The foregoing as well as other objects and advantages inherent in the invention will become more apparent from the following detailed description of two different embodiments thereof and from the accompanying drawings wherein:

FIG. 1 is a partial vertical diametral section of a somewhat simplified embodiment of the axially movable tubular connector assembly showing the piston component of the assembly advanced to its lower position into sealing engagement with the flanged upper end of one of the stand pipes;

FIG. 2 is a view similar to FIG. 1 but showing the piston component retracted to its upper position out of contact with the stand pipe and flange; and FIG. 3 is also a partial diametral section of a more practical embodiment of the invention likewise showing the piston component of the tubular connector assembly advanced into sealing engagement with the flanged upper end of a stand pipe, and which also provides an auxiliary piston-cylinder arrangement and associated pump for positively raising the piston component of the tubular connector assembly to its upper position free from contact with the stand pipe end flange.

With reference now to the drawings and to FIG. 1 in particular, the axially movable tubular connector assembly includes a stationary pressure cylinder 2 set into the pressure vessel 1 of a fuel element exchanging or charging machine 1. The pressure cylinder 2 which is positioned concentric with and above the upper flanged end 14 of a stand pipe 13 is provided with an inlet port 3 for receiving a pressurized fluid medium and an outlet port 4 for discharging the pressurized medium. To ensure continuous flow, a pump 19 has its discharge outlet connected to inlet port 3 by way of a conduit 20 and its return inlet connected to the discharge port 4 by way of conduit 17 and a heat exchanger 18 by means of which the returning pressurized fluid is cooled before re-entering pump 19 for re-cycling.

In order to simplify the drawings, a complete nuclear reactor structure has not been included and only one of the stand pipes 13 has been shown in association with the improved connector assembly to which the invention is directed, the connector assembly incorporated as a part of overall fuel element exchanging or charging machine being movable laterally across the platform of the reactor pressure vessel into position at each stand pipe.

A more complete illustration of a nuclear reactor structure and its associated charging machine and which will serve for the purpose of orientation is disclosed in a co-pending application Ser. No. 68,938 filed Sept. 2, 1970 and now abandoned, in the name of Max Zimmermann and assigned to the same assignee as is the present application.

The lower end of the stationary pressure cylinder 2 is open in the direction of a stand pipe 13 and receives an annular piston structure 6 including a skirt 7 and an annular crown 9, the piston being slidable in and out of the lower open end of the cylinder. The annular piston crown 9 has an internal diameter substantially equal to the diameter of the stand pipe 13 which it confronts at flange 14, and secured to the piston crown 9 is the lower end of an open-ended cylindric bellows unit 8 having a diameter substantially equal to the internal diameter of piston crown 9. The upper end of the bellows unit 8 is connected to the pressure cylinder 2. With such a construction, an annular chamber 12 is thus established between the bellows unit 8 and the piston skirt 7 and the cylinder wall along which the skirt slides. Inlet port 3 terminates in an annular header 5 through which pressurized fluid is distributed to the annular chamber 12 through a plurality of circumferentially spaced apertures 11 through the wall of the piston skirt 7. Axially spaced ring seal packings 10 provided between piston 6 and the wall of cylinder 2, and which are located respectively above and below the annular duct 5 and piston wall apertures 11 serve to prevent leakage, and radially spaced and concentric ring seals 15 are seated in the underface of the annular piston crown 9 so as to effect a sealing engagement with the end flange 14 of each stand pipe. The desired sealing effect between the abutting surfaces of the piston crown 9 and end flange 14 may be enhanced by flowing a barrier medium to the interface between the piston crown and end flange along a circular path intermediate the sealing rings 15 through suitable supply and removal ducts, not illustrated in this embodiment.

Since the bellows unit 8 is secured at one end to the pressure cylinder 2 and is secured at its opposite end to the piston crown 9, pressurization of the annular chamber 12 between the bellows unit and cylinder 2 by activating pump 19 will cause piston 6 to be advanced within the cylinder in the direction of the stand pipe 13 thus to cause the piston crown 9 to be thrust against the end flange 14 and establish a sealed annular butt joint, as depicted in FIG. 1. When this occurs, a sealed passageway is established between the upper end of stand pipe 13 through the interior of bellows unit 8 to the interior of the fuel element exchanging machine. Moreover, heat from the bellows unit 8 is transferred over to the pressure medium and carried by the latter via the outlet port 4 and return line 17 into the heat exchanger 18 where the heat is removed. Preferably the pressure $P_o$ of the fluid in chamber 12 at the outside of bellows unit 8 is made equal to the pressure $P_g$ of the reactor core gas existing at the inside of the bellows unit in order that these two pressures will mutually compensate one another and therefore exert equal and opposite radially acting forces on the wall of the bellows unit so that the wall of the latter will not become distorted in the radial direction.

FIG. 2 depicts the situation wherein piston 6 is retracted upwardly and raised off the stand pipe flange 14. This can be achieved in a simple manner by relaxation of the bellows unit 8 to its starting position which takes place upon complete depressurization of the connector assembly. As soon as the axially oriented restoring resilience of the bellows unit 8 overcomes the pressure forces acting in the axial direction of the stand pipe 13 on piston 6, the piston crown 9 will be raised off the stand pipe flange 14.

The embodiment illustrated in FIG. 3 is basically similar to that which has been described in relation to FIGS. 1 and 2 and corresponding components have accordingly been assigned the same reference numerals. In this embodiment, the fuel element exchanging or charging machine includes a pressure vessel 1 made from pre-stressed concrete, the sealing skin of the vessel being formed by a metallic liner 21. The base 1a of the fuel element exchanging machine bears on a platform 22 of the reactor pressure vessel 16. Each stand pipe 13 and associated end flange 14 is mounted in the pressure vessel 16 with the end flange flush with the platform 22 of the reactor. The connector assembly is shown in the so-called closed state, i.e., stand pipe 13 is open and the interior of the fuel element exchanging machine is subject to the same gas pressure as the core of the reactor.

Instead of a direct contact between the piston crown 9 and the stand pipe end flange 14, as is the case in the embodiment of FIG. 1, it will be seen that a compensating ring 23 is interposed, the ring 23 being mounted to the piston crown 9 by means of resilient spring loaded jointing elements 24, and the surface of the ring having a tapered configuration which mates with a complementarily configured seat provided in the face of piston crown 9 in order to compensate for any deviation from the correct 90° angle between the axis of the fuel element exchanging machine and platform 22 of the reactor pressure vessel, within limits.

All seal surfaces which form a barrier for the reactor gas relative to ambient atmosphere in the reactor building, are provided with at least two seals. Thus, two radially spaced seal rings 15 are provided between the inclined face on piston crown 9 and the confronting inclined face at the upper side of the compensating ring 23 and a gas extraction channel indicated by the broken lines is located within the piston crown 9 between the seal rings at the interface. Similarly, two radially spaced seal rings 15' are provided between the horizontal lower face on compensating ring 23 and the stand pipe end flange 14 and a gas extraction channel indicated by broken lines is located within the body of ring 23 between these seal rings.

Piston 6 is guided to slid within cylinder 2, and the latter is secured to the wall of the cylindrical liner 21 by means of screw fasteners, not illustrated. Piston 6 is joined, in a gas-tight manner to the pressure cylinder 2 by means of the open-ended bellows unit 8 and an annular flange 25 secured to the upper end of cylinder 2. One end of the bellows unit 8 is secured to the piston crown 9 and the opposite end of bellows unit 8 is secured to flange 25. Ring seal and packing elements 10,10' are inserted between the piston skirt 7 and the wall of cylinder 2 to block off the annular duct 5 from an additional pressure chamber 26 within cylinder 2, to be described in further detail later, the chamber 26 in turn being sealed off from the ambient atmosphere by a ring packing 27. As will be later explained, the chamber 26 is pressurized and effects movement of piston 6 in the up direction to retract the connector assembly from the stand pipe flange 14.

A pressure medium, e.g. oil, supplied through inlet ports 3 and duct 20 from pump 19 and discharged through ports 4 and duct 17 for return to pump 19 through the cooling heat exchanger 18, serves to force piston 6 downwardly and extend the bellows unit 8 and carries away heat and furthermore serves to lubricate the sliding surfaces of pressure cylinder 2 and piston 6 within the annular chamber 12. Pump 19 delivers the oil through duct 20 into an annular distribution groove 28 provided at the outer surface of cylinder 2 and thence through an array of circumferentially spaced ports 3 into the annular header duct 5 for distribution to the lower end of chamber 12 formed intermediate the piston skirt 7 and bellows unit 8 by way of an array of circumferentially spaced apertures 11 formed in the wall of the piston skirt. The pressure medium flows back from the upper end of chamber 12 through an array of circumferentially spaced exhaust ports 4 leading to another annular collection groove 29 provided at the outer surface of cylinder 2 and thence by way of duct 17 to and through the cooler 18 giving up heat from the reactor gas absorbed by the connector assembly and being returned to the intake side of pump 19. The circumferentially spaced inlet and exhaust ports 3 and 4 are provided to ensure a uniform distribution and flow of the oil over the entire circumference of the connector assembly.

In order to prevent the wall of bellows 8 from being subjected to high stresses which could occur as a result of the high pressure difference existing between the reactor gas and the ambient atmosphere, the oil present within the annular chamber 12 surrounding the bellows unit 8 is, as has already been explained in connection with the embodiment of FIGS. 1 and 2, maintained at the same pressure $p_0$ as exists in the reactor gas $p_g$ thus achieving a counterbalancing effect of the forces acting radially on the bellows units 8 in opposite directions. The pressure cylinder 2 may also be substantially freed from hoop stresses by the formation of an annular gap 30 between the exterior surface of cylinder 2 and liner 21, and admitting the pressurized reactor gas into this gap. The radially inward force established by the pressurized reactor gas on the cylinder 2 is augmented by similarly acting forces established at the lower end portion of the cylinder by the pressure of the oil in the annular grooves 28, 29 and also in groove 40 to be later described, and hence the sum of all of these forces acting on the exterior of the cylinder in a radially inward direction serve to substantially counterbalance the forces acting on the interior of the cylinder in the radially outward direction by the pressurized gas within the bellow units 8 which is transmitted through the oil filled chamber 12 and piston skirt 7 to the interior surface of cylinder 2, and by the pressurized medium within chamber 12.

Pressure equalization as between the reactor gas and the circulating oil is continuously maintained in a simple manner by the provision of serially connected ducts 32 and 33 leading from the interior of the pressure vessel 1, which is the gas chamber of the fuel element exchanging machine, to one side of a pressure-equalizing vessel 31. A duct 34 leads from a connection to the return line for the oil between cooler 18 and the intake side of pump 19 to a connection with duct 38 which leads to the other side of the pressure-equalizing vessel 31.

When the connector assembly is pressure-relieved, a pressure limiting valve 35 placed in the duct 32 serves to close this duct when the pressure reaches a preselected level, for example, 2.5 bar. A necessary minimum pressure in the equalizing vessel 31, for example, 2 bar, is maintained by opening a valve 36 interposed in duct 33. This minimum pressure ensures, on the one hand, a sufficient residual force pressing against the sealing surfaces when the connector assembly is evacuated and, on the other hand, ensures the presence of a minimum contact force when the connector assembly is newly connected to a stand pipe 13.

It is particularly advantageous to dispose the oil cooling circuit together with the cooler unit 18 and pump 19, as well as the pressure equalizing system including the vessel 31, within the pressure vessel 1 of the fuel element exchanging machine, preferably within a pressure chamber which communicates with the gas chamber of the reactor core in order to reduce the stresses and to improve the safety of the system. The advantage of such an arrangement is that no gas can escape in the event of a fracture, but pressure vessels and pipe lines are load-relieved.

In order to lift the equalizing ring 23 and piston 6 from the stand pipe flange 14, oil is discharged by another pump 39 having its intake connected to duct 38, into and through duct 37 to a further annular oil distribution groove 40 provided in the outer surface of cylinder 2. From groove 40, the oil passes through an array of circumferentially spaced ports 41 provided through the wall of cylinder 2 into an annular pressure chamber 26 formed between a piston surface established by a step 26 *a* provided on the piston skirt 7 and a step in the wall of cylinder 2, the chamber 26 being sealed off by upper and lower ring-shaped packings 10 and 27, the pressure chamber 26 being pressurized or de-pressurized through the pressure-equalizing system 32 to 45. The required lifting pressure in chamber 26 is adjustable by means of a regulating valve 42 disposed in a by-pass duct 43 in parallel with pump 39. Opening of a stop valve 44 disposed in an additional such by-pass causes complete de-pressurization of the pressure chamber 26 and of the system, and causes the skirted piston 6 to be thrust against the stand pipe flange 14 due to the minimum pressure which prevails in the pressure equalizing vessel 31.

A safety flange 46 is mounted on liner 21 to limit downward travel of piston 6, and to function as an additional safeguard in the event of a fracture of the cylinder 2, or of the piston 6, or of the mounting arrangement for cylinder 2 on liner 21, or in the event of leakage or fracture of the equalizing ring 23, in order to avoid any substantial discharge of reactor gas into the atmosphere in the event of a defect in the connector assembly.

I claim:

1. A tubular connector assembly component of a charging machine for a nuclear reactor and which is adapted to be located on and movable over a platform of the reactor into alignment with and for connection to the ends of individual stand pipes for the purpose of exchanging fuel or moderator components which are introduced into the core of the reactor through the stand pipes, said tubular connector assembly comprising a cylinder, an annular piston including a crown and a skirt arranged for sliding movement into and out of one end of said cylinder, a cylindric open-ended bellows unit disposed concentric with and interiorly of said annular piston, one end of said cylindric bellows unit being secured to said piston crown and the opposite end of said bellows unit being secured at the other end of said cylinder thereby to form an annular chamber between the bellows unit and the surrounding piston and cylinder wall, and means for admitting a pressurized fluid medium into said annular chamber to extend said bellows unit and advance said piston and to seat the annular crown thereof onto the end of a stand pipe thereby to establish a charging passageway for the stand pipe leading through said open-ended bellows unit and the other end of said cylinder into the interior of said charging machine, said pressurized fluid medium admitting means including inlet and outlet ports to and from said cylinder, and a fluid circulating system connected to said ports, said circulating system including a pump and a heat exchanger for extracting heat from the fluid medium and which is transferred to the connector assembly from hot reactor cooling gas flowing therethrough.

2. A tubular connector assembly component of a charging machine for a nuclear reactor as defined in claim 1 wherein said inlet and outlet ports to and from said cylinder include annular inlet and outlet distribution headers for the fluid medium flowing into and out of the cylinder and an array of circumferentially spaced ports leading through the wall of said cylinder and through the wall of said piston skirt.

3. A tubular connector assembly component of a charging machine for a nuclear reactor as defined in claim 1 and which further includes a compensating ring mounted to said piston crown by spring loaded jointing elements, the lower surface of said ring being planar for contact with the end of the stand pipe and the upper surface of said ring having a tapered configuration mating with a complementarily configured seat provided in the base of said piston crown thus to compensate for any deviation in alignment of the respective axes of said stand pipe and piston.

4. A tubular connector assembly component of a charging machine for a nuclear reactor as defined in claim 1 and which further includes an annular pressure chamber formed between annular steps on said piston skirt and said cylinder wall, and means for admitting said pressure chamber with a pressurized fluid for actuating said piston in the direction inwardly of said cylinder and away from the end of the stand pipe.

5. A tubular connector assembly component of a charging machine for a nuclear reactor as defined in claim 1 and which further includes radially spaced ring seals located on the lower face of said piston crown, and a gas extraction groove located intermediate said ring seals.

6. A tubular connector assembly component of a charging machine for a nuclear reactor and which is adapted to be located on and movable over a platform of the reactor into alignment with and for connection to the ends of individual stand pipes for the purpose of exchanging fuel or moderator components which are introduced into the core of the reactor through the stand pipes, said tubular connector assembly comprising a cylinder, an annular piston including a crown and a skirt arranged for sliding movement into and out of one end of said cylinder, a cylindric open-ended bellows unit disposed concentric with and interiorly of said annular piston, one end of said cylindric bellows unit being secured to said piston crown and the opposite end of said bellows unit being secured at the other end of said cylinder thereby to form an annular chamber between the bellows unit and the surrounding piston and cylinder wall, means for admitting a pressurized fluid medium into said annular chamber to extend said bellows unit and advance said piston and to seat the annular crown thereof onto the end of a stand pipe thereby to establish a charging passageway for the stand pipe leading through said open-ended bellows unit and the other end of said cylinder into the interior of said charging machine, and means for equalizing the pressure of the piston actuating fluid medium existing at the outer side of said open-ended bellows unit and the reactor gas pressure existing at the inner side of said open-ended bellows unit.

7. A tubular connector assembly component of a charging machine for a nuclear reactor as defined in claim 6 wherein said means for equalizing the pressure of the piston actuating fluid medium at the outer side of said open-ended bellows unit and the reactor gas pressure existing at the inner side of said open-ended bellows unit comprises a pressure-equalizing vessel having in operation one side subjected to the pressure of the reactor gas within said bellows unit and the other side connected to the intake side of a pump included in a system for circulating the pressurized fluid medium through said annular chamber.

* * * * *

UNITED STATES PATENT OFFICE
CERTIFICATE OF CORRECTION

Patent No. 3,847,734  Dated November 12, 1974

Inventor(s) HANS SCHWARZ

It is certified that error appears in the above-identified patent and that said Letters Patent are hereby corrected as shown below:

[73] Assignee: BBC AKTIENGESELLSCHAFT BROWN, BOVERI & CIE.

Signed and sealed this 8th day of April 1975.

(SEAL)
Attest:

RUTH C. MASON
Attesting Officer

C. MARSHALL DANN
Commissioner of Patents
and Trademarks